Patented Apr. 12, 1938

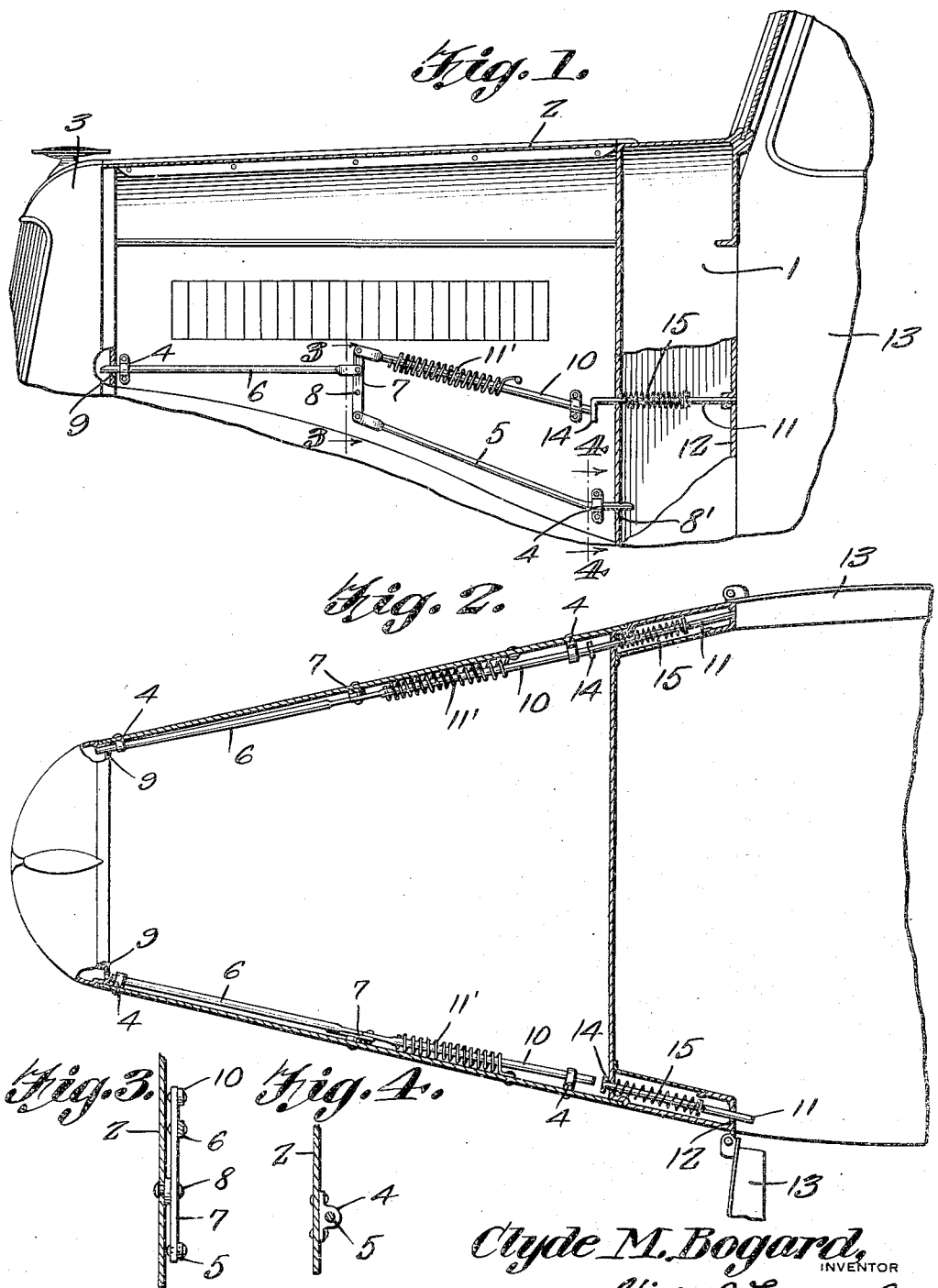

2,114,208

UNITED STATES PATENT OFFICE 2,114,208

AUTOMATIC LOCK FOR AUTOMOBILE ENGINE HOODS

Clyde M. Bogard, Avoca, Nebr.

Application March 14, 1936, Serial No. 68,959

1 Claim. (Cl. 292—5)

This invention relates to automatic locks for automobile engine hoods, and has for the primary object the provision of a device of this character which will automatically release a hood of an automobile by the opening of doors of said automobile so that if desired the hood may be opened and will secure the hood against opening on the closing of said doors of the automobile, whereby the doors on being locked in the usual way, the hood also will be locked against being opened.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view showing an automobile engine hood secured in closed position by an automatic lock constructed in accordance with my invention.

Figure 2 is a fragmentary horizontal sectional view illustrating the same.

Figure 3 is a sectional view taken on the line 3—3 of Figure 1.

Figure 4 is a sectional view taken on the line 4—4 of Figure 1.

Referring in detail to the drawing, the numeral 1 indicates a fragmentary portion of an automobile body having associated therewith an engine hood 2. The hood 2 is mounted between the body and the radiator 3.

Each side of the hood has slidably mounted thereto by brackets 4, locking bars or rods 5 and 6, the adjacent ends of said rods being pivoted to a lever 7 which in turn is pivoted to the hood, as shown at 8. The rods 5 and 6 extend in opposite directions and the rod 5 is adapted to enter an aperture 8' of the body 1, while the rod 6 is adapted to enter an aperture 9 of the radiator or some other form of keeper (not shown). An operating rod 10 is pivoted to the lever 7 and has connected thereto a coil spring 11' acting to position the rods 5 and 6 out of their respective apertures and thereby free the hood for opening.

The automobile body slidably supports plungers 11, which plungers extend through the door jambs 12 of the body to be engaged by the doors 13 of the automobile when said doors are in closed position. The plungers have heads 14 contacting the operating rods 10. Coil springs 15 are connected to the plungers for urging the latter away from the operating rods 10.

The doors 13 when in closed position contact and slide the plungers 12 which in turn slide the operating rods 10 rocking the levers 7, causing the rods 5 to enter their respective apertures thereby securing the hood in closed position. Thus it will be seen that when the doors 13 of the automobile are locked in the usual way that my invention operating in conjunction with the doors also lock the hood against being opened. However, when the doors 13 move into open position, the plungers 11 slide under the influence of the springs 15 and the springs 11' act to draw the rods 5 and 6 out of their respective apertures, freeing the hood so that it may be opened.

Having described the invention, I claim:

In combination with an automobile including a body having doors, a radiator having keepers, a hood engaging the radiator and the body and a wall at the rear end of the hood provided with keepers; a lever, means engaging the lever intermediate the ends thereof pivotally securing said lever to the inside of the hood, a locking rod pivotally secured at one end to said lever at one side of said first pivot means and extending forwardly in the direction of the radiator, a second rod pivotally secured at an end thereof to said lever on the opposite side of said first means and extending rearwardly in the direction of said wall, guide means for said rods carried by said hood, a lever operating rod pivotally secured at one end to said lever above the pivotal connection between said first rod and said lever, guide means for said operating rod, a spring secured to said operating rod and said hood and normally urging said operating rod to released position, and a spring-pressed plunger slidable through said wall and having one end thereof disposed in confronting relation to the opposite end of said operating rod and the other end positioned for contact with an edge of a door whereby closing of said door will move said plunger to thereby move said operating rod to locking position.

CLYDE M. BOGARD.